Jan. 30, 1934.  F. O. L. CHORLTON  1,944,967
VACUUM SEALING MACHINE FOR BOTTLES, CANS, AND THE LIKE
Filed Sept. 30, 1932   2 Sheets-Sheet 1
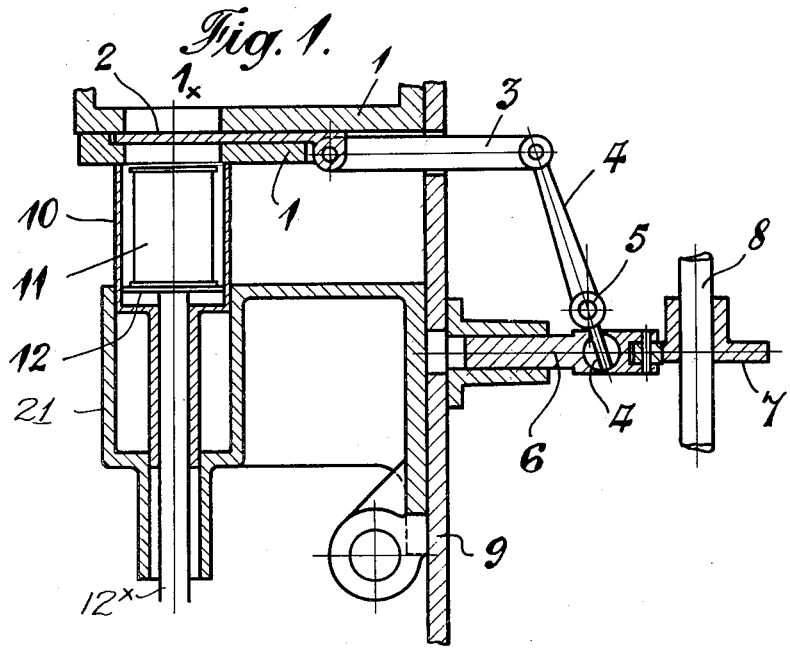
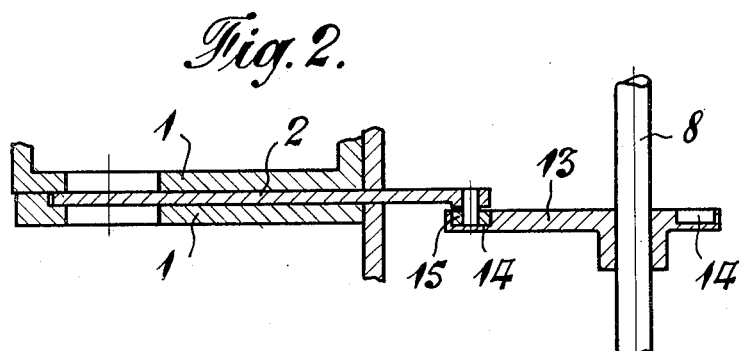
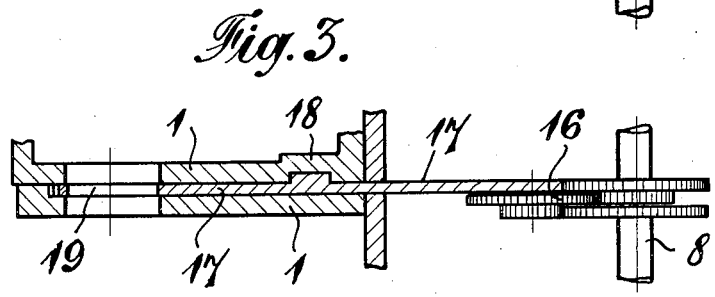
Inventor:-
Frank Oscar Levi Chorlton
By Attorney:- Arthur Gadd.

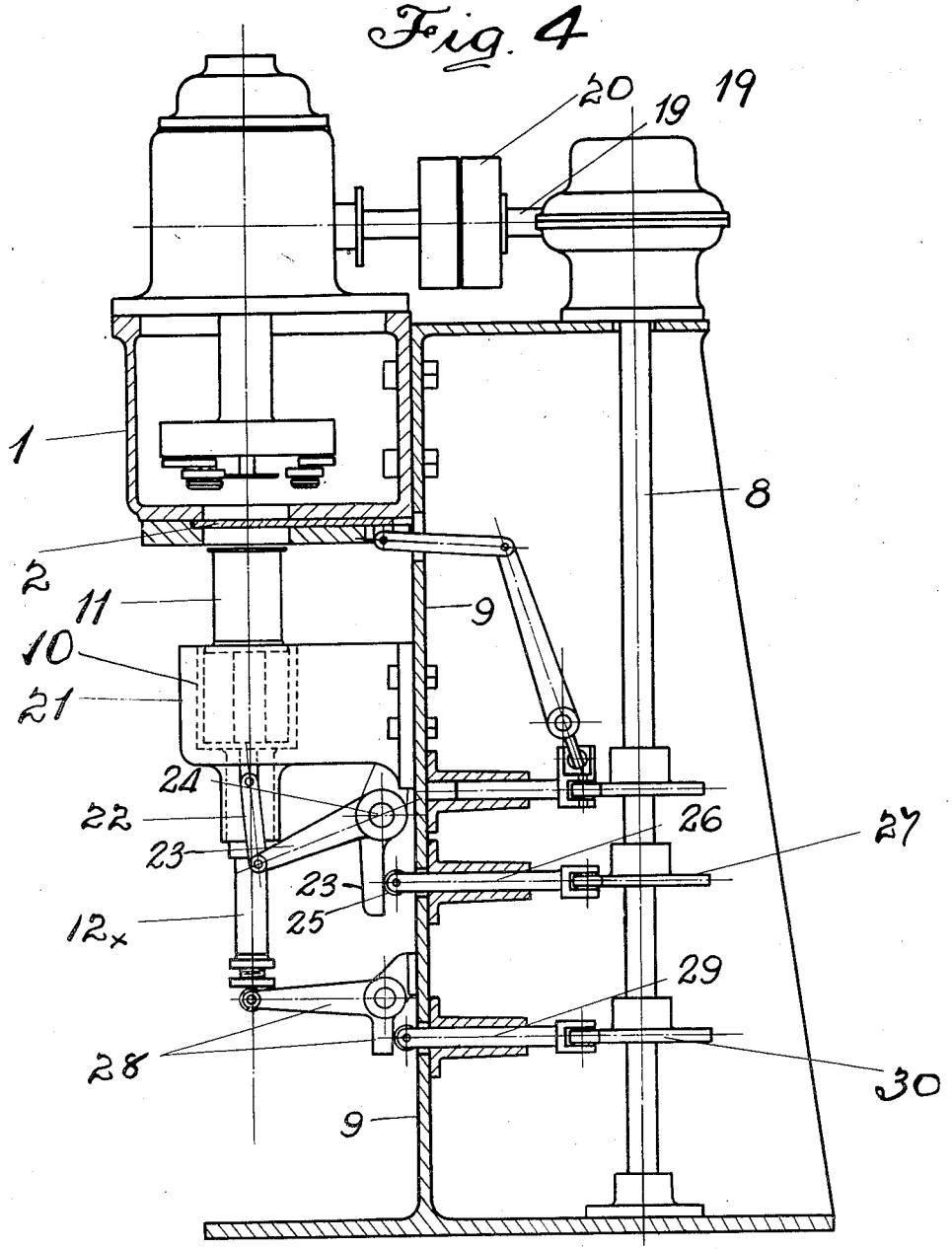

Patented Jan. 30, 1934

1,944,967

UNITED STATES PATENT OFFICE 1,944,967

VACUUM SEALING MACHINE FOR BOTTLES, CANS, AND THE LIKE

Frank Oscar Levi Chorlton, Bury, England

Application September 30, 1932, Serial No. 635,629, and in Great Britain October 16, 1931

6 Claims. (Cl. 226—82)

The invention relates to that type of vacuum sealing machine in which the lids of cans containing food or other products, and the stoppers of bottles and other vessels, or caps thereof, are sealed on the cans or bottles under a vacuum or partial vacuum in a sealing chamber. Below this chamber is a table for supporting the vessel movable within what is called the ante-chamber or sealing cylinder.

In order to produce the requisite vacuum considerable power is involved in the working of the vacuum pump, and the object of my present invention is to reduce the expenditure of this power by reducing the amount of air to be evacuated at each operation.

For this purpose I introduce a movable plate or disc-like shutter or like intercepting means which is capable of being automatically and periodically passed across the aperture leading into the sealing chamber and above a movable sealing cylinder for the vessel concerned, or across a part for closing the sealing chamber an airtight manner.

With reference to the accompanying drawings, Fig. 1 is a sectional elevation of a vacuum sealing machine in the neighbourhood of the sealing chamber only provided according to a form of my invention.

Figs. 2 and 3 illustrate modifications of means employed for moving the intercepting means shown in Fig. 1 aforesaid. Fig. 4 is a sectional elevation of a vacuum sealing machine arranged according to my invention, and on a different scale to the foregoing figures.

In Fig. 1 referred to, the lower part of the sealing chamber is shown at 1, the sealing mechanism being assumed above it in the space marked $1_x$. In Fig. 4 the complete sealing chamber 1 is shown. According to my invention a slidable shutter or disc-like intercepting device 2 is provided capable of movement at right angles to the vertical axis of said chamber 1 by being mounted in channels or bearings below the latter.

This shutter or plate 2 is given a reciprocating motion by being connected by a link 3 to a lever 4 pivoted at 5 on some part of the framing of the machine.

Another part of said framing is shown at 9, the lower end of the lever 4 engages a movable rod or member 6 slidable in bearings, shown attached to the framing 9 aforesaid. The rod 6 is caused to be moved by an adjacent cam 7 on a cam shaft 8. The latter is assumed to be revolved at a speed consistent with its dimensions so that the shutter 2 will uncover or cover the aperture above it in the sealing chamber 1 at the correct times.

At the conclusion of a sealing operation with the aperture into the sealing chamber open for the purpose, and the sealing cylinder shown at 10 in airtight contact with the lower part of the former, the sealing chamber referred to may be closed by the requisite movement of the shutter 2 after the withdrawal of the vessel from the sealing chamber and prior to the commencement of the withdrawal of the sealing cylinder 10. In this way, passage of air into the sealing chamber is prevented at such withdrawal. A vessel so sealed or to be sealed is indicated at 11 and the table upon which it stands at 12.

The mechanism for operating the shutter may be arranged or devised in various ways. In Fig. 2 it is connected to a member 13 provided with an eccentrically arranged groove 14 within which works a bowl 15 revolubly mounted on the shutter 2. The member 13 is attached to shaft 8 for being driven thereby.

In Fig. 3 the disc-like shutter is in revoluble form and indicated at 17, connected by a train of wheels to said shaft 8. This shutter 17 is pivoted at 18, on the part 1 already mentioned, and is formed with a suitably shaped aperture 19 so that as the shutter revolves the aperture 19 will open the inlet into the sealing chamber at the requisite moments. It is assumed that the shutter 17 is provided with suitable teeth for gearing with the gear wheel provided for it as indicated. It is adapted as shown to slide in rotary manner between the movable sealing cylinder 10 and the interior of the sealing chamber 1.

It will be seen that the aperture 19 is one method of forming a break in the continuity of the shutter as a revoluble device capable of covering or uncovering said aperture.

In Fig. 4 the sealing cylinder 10 of Fig. 1 is assumed to be lowered within the table bracket 21 of the machine, but links connected at each side thereof (one of these links being indicated at 22 in Fig. 4) are connected to a two-armed lever device 23 pivoted at 24 at said table bracket. The lever device named is movable by being impinged against by a bowl 25 on the end of a push rod 26, the latter in connection with a cam 27 attached to a revoluble shaft 8 aforesaid. This shaft is capable of being in gear connection with a horizontal shaft 19 having a driving pulley 20 attached thereto.

Similarly, a spindle $12_x$ attached to a table 12 on which the vessel 11 stands, is in Fig. 4 shown operated by a two-armed lever device 28 pivoted at a part of the frame 9 of the machine, by means of a push rod 29 in connection with the cam 30, the latter being attached to the shaft 8 aforesaid.

I claim:

1. For a vacuum sealing machine for sealing bottles, cans and the like, a sealing chamber, with an aperture leading therein, a movable sealing cylinder external of said sealing chamber, a vessel-support movable within said sealing cylinder, a movable disc-like member capable of being automatically and periodically passed above said sealing cylinder and across said aperture of said sealing chamber for closing the said aperture therein in an air-tight manner, after the withdrawal of the vessel-support, for the purpose and as herein set forth.

2. For a vacuum sealing machine for sealing bottles, cans and the like, a sealing chamber, with an aperture leading therein, a movable sealing cylinder external of said sealing chamber, a vessel-support movable within said sealing cylinder, a slidable disc-like shutter capable of being automatically and periodically passed above said sealing cylinder and across said apertures of said sealing chamber for closing the said aperture in the latter in an air-tight manner, after the withdrawal of the vessel-support, for the purpose and as herein set forth.

3. For a vacuum sealing machine for sealing bottles, cans and the like, a sealing chamber, with an aperture leading therein, a movable sealing cylinder external of said sealing chamber, a vessel support movable within said sealing cylinder, a slidable disc-like shutter capable of being automatically and periodically passed above said sealing cylinder and across said aperture of said sealing chamber for closing the said aperture in the latter in an air-tight manner, after the withdrawal of the vessel-support, driven mechanism in connection with said shutter for operating the same, all for the purpose and as herein set forth.

4. For a vacuum sealing machine for sealing bottles, cans and the like, a sealing chamber, with an aperture leading therein, a movable sealing cylinder external of said sealing chamber, a vessel-support movable within said sealing cylinder, a revoluble discontinuous disc-like shutter capable of being automatically and periodically passed above said sealing cylinder and across said aperture of said sealing chamber for closing the said aperture in the latter in an air-tight manner, after the withdrawal of the vessel-support, for the purpose and as herein set forth.

5. For a vacuum sealing machine for sealing bottles, cans and the like, a sealing chamber, with an aperture leading therein, a movable sealing cylinder external of said sealing chamber, a vessel-support movable within said sealing cylinder, a revoluble discontinuous disc-like shutter capable of being automatically and periodically passed above said sealing cylinder and across said aperture of said sealing chamber for closing the said aperture in the latter in an air-tight manner, after the withdrawal of the vessel-support, driven mechanism in connection with said revoluble shutter for operating the same, all for the purpose, and as herein set forth.

6. For a vacuum sealing machine for sealing bottles, cans and the like, a sealing chamber, with an aperture leading therein, a movable sealing cylinder external of said sealing chamber, a vessel-support movable within said sealing cylinder, a revoluble disc-like shutter capable of being automatically and periodically passed between said sealing cylinder and across said aperture of said sealing chamber for closing the said aperture therein, in an air-tight manner, after withdrawal of the vessel-support, driven mechanism in connection with said revoluble shutter for operating the same, all for the purpose and as herein set forth.

FRANK OSCAR LEVI CHORLTON.